(12) United States Patent
Clark et al.

(10) Patent No.: US 7,172,698 B2
(45) Date of Patent: Feb. 6, 2007

(54) ANAEROBIC SLUDGE DIGESTER

(75) Inventors: Sidney E. Clark, Madison, WI (US); John R. Currie, Batania, IL (US)

(73) Assignee: Chicago Bridge & Iron Company, Plainfield, IL (US)

( * ) Notice: Subject to any disclaimer, the term of this patent is extended or adjusted under 35 U.S.C. 154(b) by 93 days.

(21) Appl. No.: 10/682,050

(22) Filed: Oct. 9, 2003

(65) Prior Publication Data

US 2005/0077238 A1    Apr. 14, 2005

(51) Int. Cl.
*C02F 3/00*    (2006.01)
(52) U.S. Cl. .................... 210/603; 210/194; 210/497
(58) Field of Classification Search ............. 210/603, 210/194, 197
See application file for complete search history.

(56) References Cited

U.S. PATENT DOCUMENTS

| | | | | |
|---|---|---|---|---|
| 3,997,437 A | * | 12/1976 | Prince et al. | 210/623 |
| 5,409,610 A | * | 4/1995 | Clark | 210/603 |
| 5,605,653 A | * | 2/1997 | DeVos | 261/77 |
| 5,779,890 A | * | 7/1998 | Bailey | 210/197 |
| 5,942,116 A | * | 8/1999 | Clark et al. | 210/603 |
| 6,454,944 B1 | * | 9/2002 | Raven | 210/603 |
| 2002/0192809 A1 | * | 12/2002 | Lanting et al. | 435/290.1 |

FOREIGN PATENT DOCUMENTS

| | | | |
|---|---|---|---|
| JP | 08033900 A | * | 2/1996 |
| JP | 2005185886 A | * | 7/2005 |

* cited by examiner

Primary Examiner—Chester T. Barry
(74) Attorney, Agent, or Firm—Marshall, Gerstein & Borun LLP (57) ABSTRACT

An egg-shaped anaerobic sludge digester has upper and lower draft tubes, and an optional middle draft tube. The draft tubes are arranged so that liquid can be (1) simultaneously pumped downwards through the upper (or middle) draft tube and upwards through the lower (or middle) draft tube; (2) simultaneously pumped upwards through two or more draft tubes; or (3) simultaneously pumped downwards through two or more draft tubes. When a middle draft tube is provided, it can be used in place of the upper draft tube when the liquid surface in the digester falls below the top of the upper draft tube. Alternatively, the middle draft tube can work as a coordinated relay conduit to move liquid either in the same direction as the upper draft tube or to move liquid in the same direction as the lower draft tube.

13 Claims, 7 Drawing Sheets

ANAEROBIC SLUDGE DIGESTER

The present invention relates generally to apparatus for the anaerobic digestion of sludge produced in wastewater treatment processes and the like. More particularly, it relates to process improvements and systems for enhancing process control, mixing, sludge circulation, and foam/froth control in large-volume, tall, cylindrical and egg-shaped digesters.

BACKGROUND OF THE INVENTION

A wide variety of types of sludge, including municipal sewage sludge, are treated in anaerobic digesters. Historically, anaerobic sludge digestion has been used for stabilizing primary clarifier sludge. More recently, anaerobic digestion has been applied to biological sludge produced by activated sludge and/or trickling filter processes. Anaerobic digestion has also been applied to sludge mixtures including significant (in some cases up to 100%) industrial waste contributions.

Some of these sludges include significant quantities of aerobic microorganisms that are not easily decomposed in an anaerobic digester. Municipal sewage sludge, for example, typically includes significant quantities of manufactured products (ranging from fibrous toiletry products to plastics) or other synthetic products (ranging from long filaments to sheets of bulky materials). In almost all cases, the raw sludge sent to an anaerobic digester is a very diverse and complex mixture of materials ranging from simple inert silt, sand, and soil particles to very complex organic molecules and particles.

During anaerobic digestion, materials are segregated in two directions. Some relatively light materials entrap rising bubbles and are transported to the liquid surface. Similarly, some of the microscopic biomass in raw sludge retains microscopic bubbles and is transported to the surface. Materials having a specific gravity less than the contents of the digester will also rise to the liquid surface through natural buoyancy. In contrast, inert and other heavier materials settle to the bottom of the digester.

Stagnation of material within the anaerobic digester can create process and operational problems. When material stagnates either at the top surface or at the vessel bottom, the digestion process slows substantially, reducing the amount of solids degradation. In addition, rising materials can create a foam, froth, or scum layer that can expand rapidly as new material arrives at the surface and gas expands the surface mass. Accumulating foam, froth, and/or scum at the surface can migrate into gas handling and/or digester safety valve devices, causing problems with the transport of digester gas to other systems.

To avoid such problems, effective digester mixing is important. Current mixing systems are designed to move light material from the digester top to the digester bottom (where it is released and allowed to migrate through the main digester mass back to the top), and to move heavy materials from the digester bottom to the digester top (where they are released and allowed to migrate through the main digester mass back to the bottom).

In general terms, the need for mixing is influenced by a combination of factors. Factors can include, for example, the vessel shape and the general liquid movement throughout the vessel. Experience has shown that egg-shaped vessels, with top and bottom sections conformed to provide adequate slopes for urging the migration of materials toward the center of the vessel, only require volume turnover rates of 3 to 9 times per 24-hour period for sufficient mixing of the digester. The bottom sections of such digesters generally have cone-shaped side slopes of at least 35° measured from the horizontal. The top sections are generally in the shape of an inverted cone or a continuation of a spherical mid-section. These shapes significantly reduce the liquid surface area in the top section from the larger cross-sectional area that is available near the mid-section of the vessel. Egg-shaped vessels (which typically have either a spherical or barrel-shaped section at their mid-section) can utilize the established mid-section shape as a continuation up to the vessel top to reduce the liquid surface area. These various vessel shapes have been widely utilized in Europe and the Far East, and have gained increasing acceptance in North America over the years as they have been installed at a number of sites.

Another factor bearing on the need for mixing is the speed at which sludge migrates to the liquid surface and to the vessel bottom. In large, tall digesters, the migration pathways from the release point back to the top or bottom of the digester can be long, and movement of the materials take a considerable time. Longer migration times can result in stagnation within the digester contents, creating the potential for reduced biological activity and therefore a reduction in the effectiveness of the digester to degrade solids. To prevent stagnation from occurring, more mixing energy per unit volume may be required for larger, taller vessels.

A large majority of the European egg-shaped digesters are mixed with some kind of liquid circulation system. Two general types of systems are used: externally-pumped circulation mixing systems and central draft tube mixing systems.

Externally-pumped circulation mixing systems draw liquid from one section of the vessel and re-inject the liquid at a different location in the vessel. Typically, the mass transport is between the two critical sections of the vessel, the top section and the bottom section. Nozzles are placed at various locations to eliminate the potential for stagnation and prevent short-circuiting within the mixing system for the vessel. In some instances, a nozzle is located above the liquid surface for the control of foam in the upper area of the vessel.

Externally-pumped mixing systems have worked well, but have some operational and economic limitations in large digesters. They can become very complex and expensive as the size of the digester increases. Due to the rising complexities and costs, European engineers generally consider the maximum capacity for a digester utilizing an externally-pumped system to be 3000 to 4000 $m^3$ (approximately 800,000 to 1,000,000 gallons).

Mixing in larger European digesters is typically done with a central draft tube that has a mechanical propeller mixer located near the top of the draft tube. Material is pumped through the draft tube for transport between the top section and bottom section of the digester. The mechanical mixer can have its rotational direction reversed so that the direction of flow through the draft tube can be either up or down. For foam control, the mixer shaft is usually furnished with a splash disk located above the operating liquid level, although the splash disk has not proven to be an effective method of foam control in many cases. Nonetheless, many North American facilities have applied the well-established European mechanical mixer with central draft tube design with good success.

Several American and Canadian facilities have recently utilized a patented system that couples one or more jet pumps to a central draft tube. The jet pumps are located at the bottom and at the top of the central draft tube and use the momentum of a high-velocity discharge directed at the mouth of a venturi section on the end of the draft tube to induce the surrounding liquid into the mouth of the draft tube, thus providing a strong pumping action. In jet pump systems, additional high-velocity discharge nozzles have been positioned above the liquid surface to provide a more effective method of foam, froth, and scum control. For digesters up to about 4,900 m$^3$ (1,300,000 gallons), jet pump draft tube mixing systems have provided a simpler and more economical approach to mixing than the systems developed in Europe.

It appears to some in the industry that the pumping requirements for moving large quantities of sludge between the top and bottom sections of tall digesters effectively limits the size of digesters using a single, central draft tube mixing arrangement to about 5,700 m$^3$ (1,500,000 gallons), especially with respect to a jet pump system. One reason for this is that larger digesters appear to require more mixing energy, on a per-unit volume basis, than smaller digesters. Another is the heterogeneous nature of wastewater sludge. Various components of sludge have different specific gravities, which cause solids containing different proportions of those components to migrate to different sections in the digester water column. A draft tube mixing system is designed to develop a strong flow of liquid with a relatively low energy. When the system is required to move a water column in the draft tube that is loaded with bottom material (which is significantly heavier than the water alongside the draft tube), the efficiency of the system decreases. As the height of the draft tube increases, the mixing capacity of a conventional draft tube system decreases, increasing the potential for stagnation within the vessel.

The ability to control foam, froth, and/or scum can also be affected by the size of the digester. As the volume of an egg-shaped and/or cone-cylinder-cone digester increases, the ratio of the liquid surface area (at the operating liquid level in the digester) to the digester volume decreases. For example, the liquid surface area through which gas must pass to enter the cylindrical gas collection dome of a large, egg-shaped digester with a volume of 10,000 m$^3$ is only roughly twice that of a small, egg-shaped digester with a volume of 2,000 m$^3$. As a result, the ratio of the surface area to digester volume of the larger digester is about 40% of the ratio for the smaller digester. The larger digester handles five times the sludge volume and therefore produces five times the gas of the smaller digester. Thus, the larger digester is passing five times the gas through a surface area that is only about twice as large as the surface area in the smaller digester. The smaller ratio of surface area to digester volume reduces the capacity of the larger digester to control foam, froth, and/or scum in comparison to the smaller digester. Viscosity and/or unique sludge molecular properties can further diminish the foam, froth, and/or scum handling capacity of large egg-shaped digesters compared to the corresponding capacity in small egg-shaped digesters.

Operational issues may also arise in connection with wastewater facilities that divide the microbiological reactions of the digestion process into two or more vessels operated in series. These systems vary in configuration and process operation, but generally divide the digestion process into two phases referred to as an acid phase and a gas phase.

A relatively constant hydraulic retention time is usually desired during the acid phase in order to achieve optimum process results. If the population of the community served by a wastewater treatment system stayed static, and the waste sludge flowed under steady-state, homogeneous conditions, then the selection and sizing of the acid phase digester could be relatively easy and straightforward. However, feed rates (and water quality) typically change in municipal wastewater facilities, so operational control of the digester facility retention times is generally needed, especially in the acid phase of the two-phase digestion process.

To accommodate changing flow rates in the municipal wastewater facility, acid phase digester vessel(s) are preferably equipped to handle volume increases and/or reductions depending upon the incoming sludge quantity and quality. Typically, retention time is adjusted by varying the liquid depth in the vessel. These depth variations can be significant. In some cases, the liquid level may vary as much as 40%.

Egg-shaped digesters have typically been operated at a relatively-constant liquid level. Under full-depth conditions, the liquid surface area is small and foam spray knockdown systems can be effective at breaking up emulsions that can otherwise develop into foam, froth, and/or scum. Once the emulsions are broken up, the solids and water can be captured by the draft tube and transported from the surface to the bottom section of the vessel.

However, when liquid depth within the vessel is reduced, the liquid surface area can grow by several times. The larger area allows the light solids to escape capture either in a draft tube or through an overflow weir or inlet associated with the discharge system. A significant drop in the operating liquid level can also significantly reduce the effectiveness of the central draft tube mixing system, especially when the level drops below the top of the draft tube. This phenomenon makes mixing in large egg-shaped digesters much more difficult.

The mixing arrangements conventionally used to deal with liquid depth variations in egg-shaped or acid-phase digesters are complex. Typically, the mixing system relies on an externally-pumped circulation system that includes a series of pump suction and discharge nozzles designed to allow liquid to be withdrawn from any of a variety of different liquid depths in the vessel and returned to one of many different depth options for forced circulation. The locations of the nozzles are positioned throughout the vessel to impart mixing energy in all areas of the vessel (including the top and bottom sections of the vessel) without creating short-circuiting in the system. Coordination of these various nozzles makes the system complex, and thus expensive to construct and operate.

SUMMARY OF THE INVENTION

The improvements incorporated in the digester and process control and supporting apparatus of the present invention expand the usefulness of large, tall digester vessels.

In the preferred embodiment of this invention, the digester has multiple independent draft tubes designed to transport material from the top section of the digester to the middle section and from the bottom section to the middle section. The arrangement of the draft tubes can vary. Preferably, the tubes are axially aligned on the vessel centerline. In systems utilizing only two draft tubes, the tubes can be axially aligned with the upper end of the first draft tube in the top section of the digester, the lower end of the first draft tube and the upper end of the second draft tube both in the middle section of the digester, and the lower end of the second draft tube in the bottom section of the digester. A middle draft tube can also be positioned between the upper and lower draft tubes.

The digester includes the structure necessary for pumping liquid through each of the draft tubes. For example, the digester may have separate jet pumps at each end of each draft tube.

The draft tubes are arranged so that liquid can be (1) simultaneously pumped downwards through the upper (or middle) draft tube and upwards through the lower (or middle) draft tube; (2) simultaneously pumped upwards through two or more draft tubes; or (3) simultaneously pumped downwards through two or more draft tubes. These options can provide better management and control of the digestion process in each section of the digester. For example, top section management for foam, froth, and/or scum control may sometimes be tailored to the existing process and physical conditions without having serious impact on the overall mixing capacity of the digester.

A configuration using three draft tubes can be particularly advantageous in installations where the liquid level may be substantially changed to control the hydraulic retention time in the digester. When the liquid surface is below the top of the upper draft tube, the middle draft tube may be used as the upper draft tube as described above. When the liquid surface is at or above the top of the upper draft tube, the middle draft tube can function independently, or work as a coordinated relay conduit to move liquid either in the same direction as the upper draft tube or to move liquid in the same direction as the lower draft tube.

BRIEF DESCRIPTION OF THE DRAWINGS

The invention may be better understood by referring to the accompanying drawings, in which.

DETAILED DESCRIPTION

FIGS. 1–7 show various anaerobic sludge digester vessel shapes that can be used in practicing the present invention. Each of the digesters 10 has a bottom section 12, a middle section 14, a top section 16, and a gas-collecting section 18.

Figures 1, 2, 3, 4, 5:
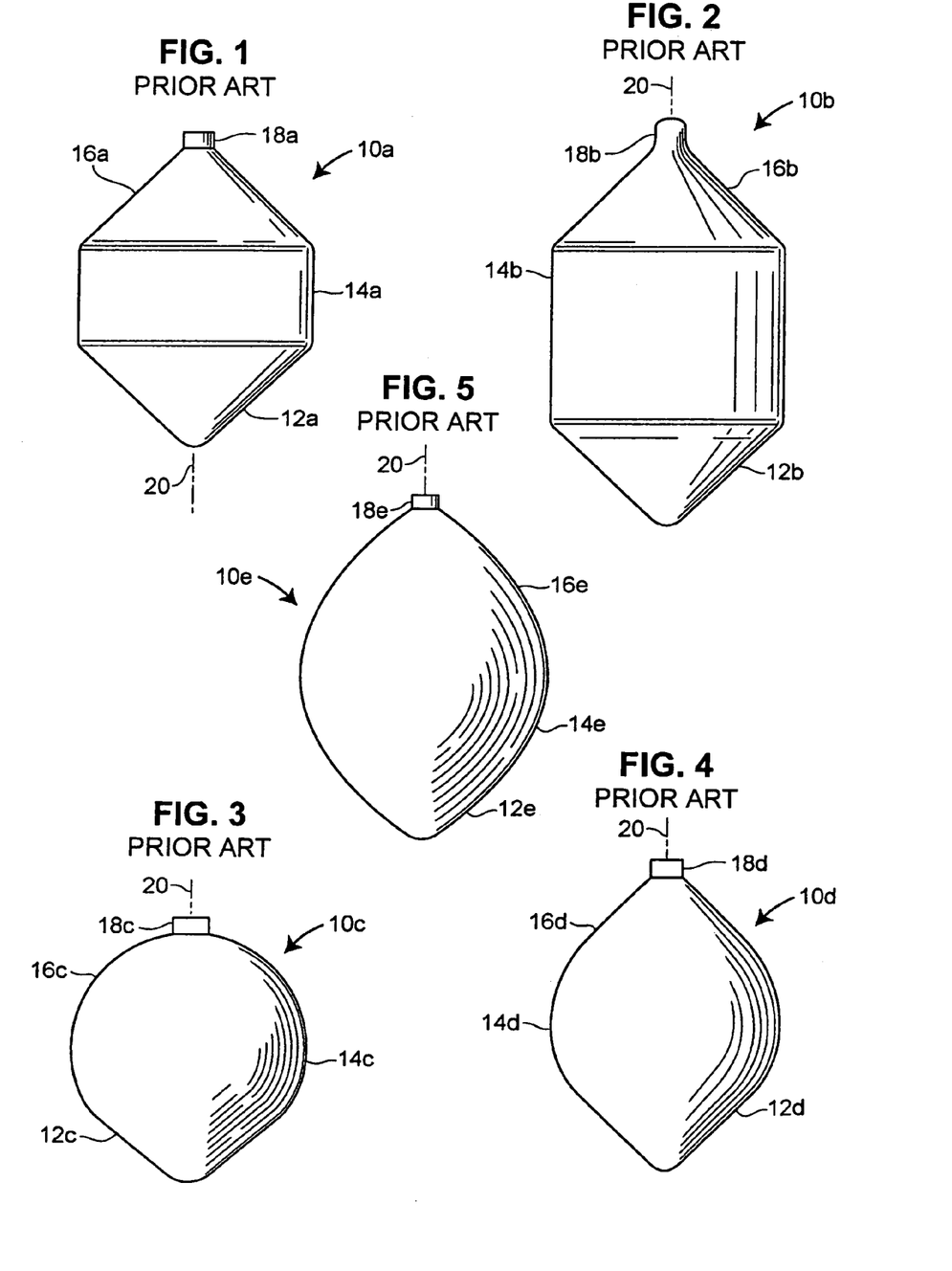
FIGS. 1–7 are side views of several possible alternative shapes that a digester in accordance with the present invention may have.

The digester 10a shown in FIG. 1 has a conical bottom section 12a, a circular cylindrical middle section 14a, a conical top section 16a, and a cylindrical gas-collecting section 18a.

FIG. 2 illustrates a taller modification of the digester shown in FIG. 1. The digester 10b has a conical bottom section 12b, a circular cylindrical middle section 14b that is taller than the corresponding section 14a of the digester 10a shown in FIG. 1, a conical top section 16b, and a cylindrical gas-collecting section 18b.

FIG. 3 illustrates a digester 10c characterized by a low height-to-diameter ratio, which can be useful in facilities that have digester height constraints. The digester 10c has a conical bottom section 12c joined to a spherical middle section 14c (which replaces the cylindrical middle section 14a or 14b of the digesters in FIGS. 1 and 2). The spherical shape of the middle section continues through a top section 16c to a cylindrical gas-collecting section 18c.

The digester 10d illustrated in FIG. 4 has a conical bottom section 12d, a spherical middle section 14d, a conical top section 16d, and a cylindrical gas-collecting section 18d.

FIG. 5 illustrates an "egg-shape" commonly used for large digesters constructed in Germany. The digester 10e has a cylindrical gas-collecting section 18e. A conical bottom section 12e provides a steep-sided transition to a small bottom. A conical top section 16e allows a gradual transition from a barrel-shaped middle section 14e to a gas-collecting section 18e.

Figure 6:
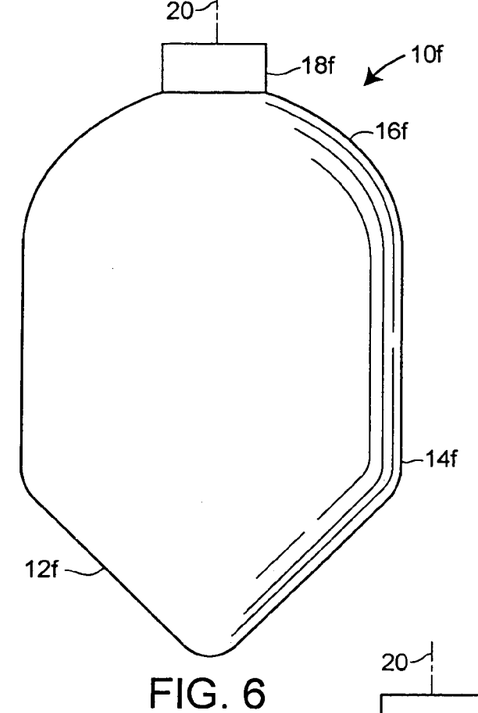

FIG. 6 illustrates a taller modification of the digester shown in FIG. 1. The digester 10f has a conical bottom section 12f, a circular cylindrical middle section 14f that is taller than the corresponding section 14a of the digester shown in FIG. 1, a domed top section 16f, and a cylindrical gas-collecting section 18f.

Figure 7:
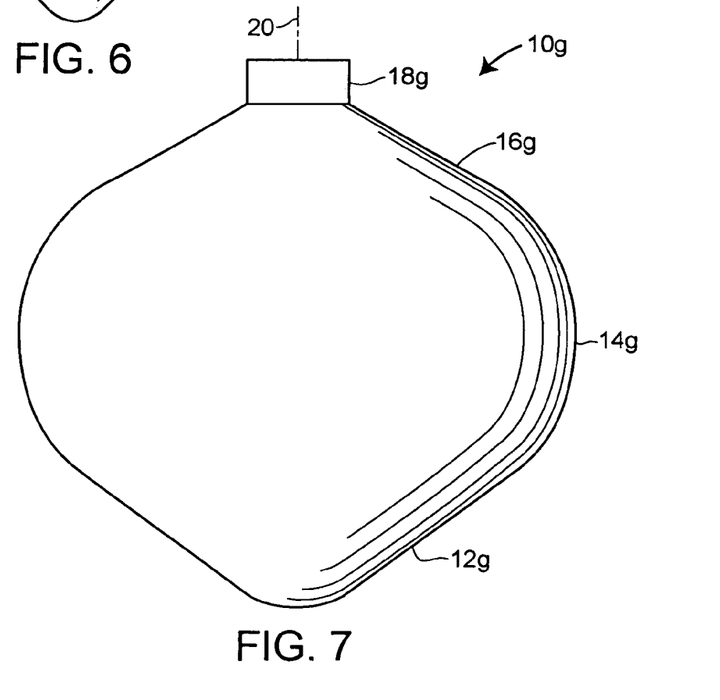
Figure 8:
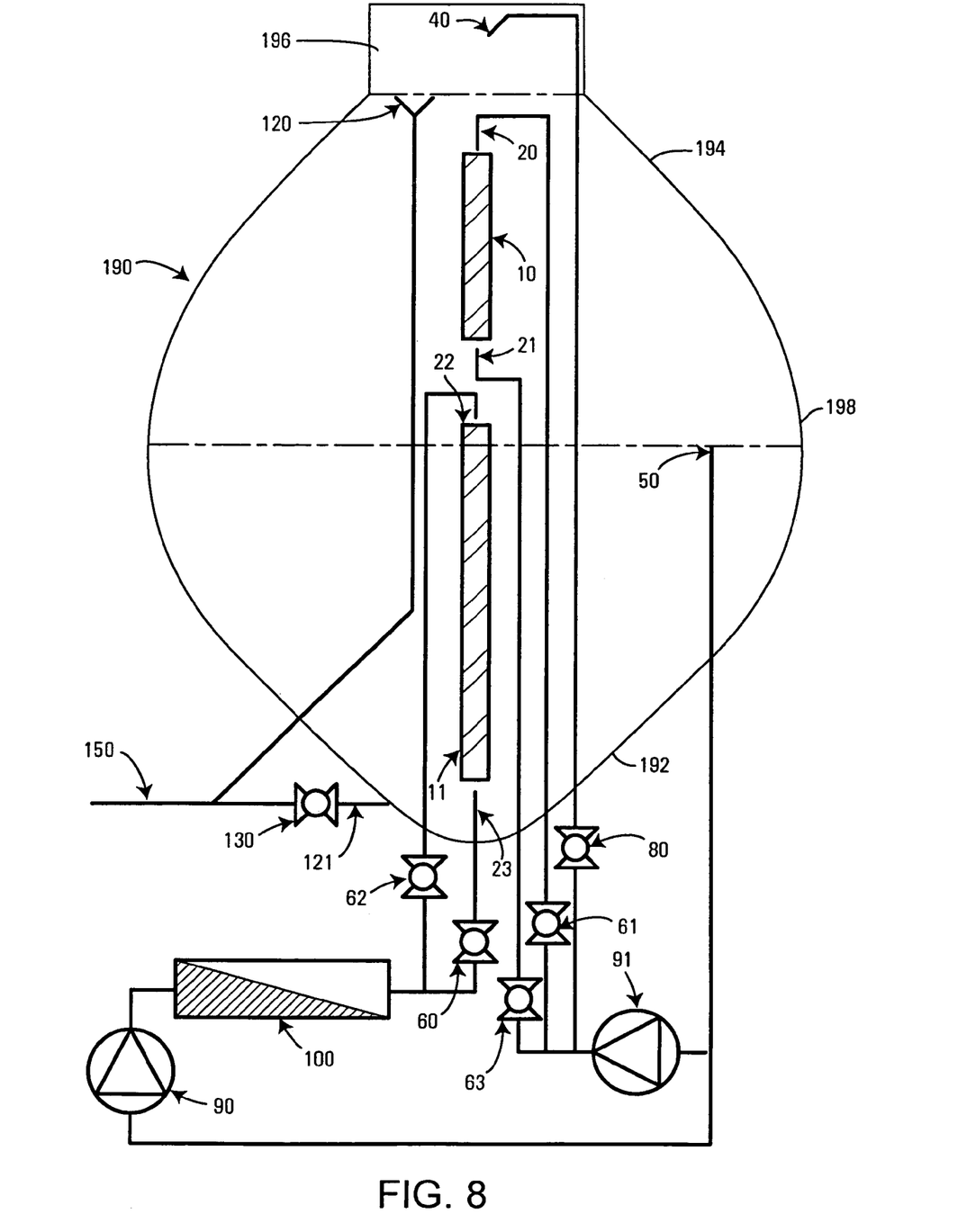
FIGS. 8–12 are sectional side views of an egg-shaped digester with various embodiments of mixing and discharge systems in accordance with the present invention.

FIG. 7 illustrates another digester 10g characterized by a low height-to-diameter ratio. The digester 10g has a conical bottom section 12g joined to a spheroidal middle section 14g that is developed using an offset radius. The spheroidal shape continues to a conical top section 16g and a cylindrical gas-collecting section 18g.

All of the digesters illustrated in FIGS. 1 to 7 have a central vertical axis 20 and are circular in horizontal section for most of their height. They all have a wide middle section 14 and gradually decrease in width from the middle section to a top section 16 and to a bottom section 12.

The bottom section 12 of the illustrated digesters has an important function. It funnels heavy digester liquid to a central location near the bottom of the digester, where the lower end of a draft tube, described below, is located. It is preferred that the slope of the bottom section be adequate to ensure that sludge (particularly heavy or high-specific-gravity solids) will not settle away from the lower end of the draft tube and thus be isolated from the mixing action provided by the draft tube. The bottom sections of the digesters illustrated in FIGS. 1 to 7 desirably have a steep side slope of at least 15 degrees, and desirably at least 45 degrees from the horizontal.

The shape and height of the middle section 14 of a digester in accordance with this invention is largely dictated by process volume requirements and facility site conditions. The process volume requirements are set by the amount of sludge to be treated and the degree of stability that is desired in the final digested sludge product. In general, the overall digester height (or depth) is preferred to be at least 0.75 times and desirably at least 1.5 times greater than the major diameter of the digester. Generally, the middle section provides most of the vessel volume.

The top section 16 of the illustrated digesters provides a transition between the middle section 14 and the smaller gas-collection section 18. The sides of the top section limit the area of the liquid surface where foam and scum form and accumulate. The slope of the top section is preferably at least 15 degrees, and desirably up to about 45 degrees, from horizontal.

The digesters 10 illustrated in FIGS. 8–12 have a preferred shape for a digester in accordance with the present invention. While the shape illustrated in FIGS. 8–12 is comparable to the one shown in FIG. 5, it is believed that the invention can also be utilized in digesters having any of the shapes shown in the other figures, as well as other similar shapes.

Unlike previously-known egg-shaped digesters, a digester in accordance with the present invention has at least two draft tubes. The digester 10h seen in FIG. 8, for example, has two draft tubes 30 and 32 that are axially aligned on the central vertical axis 20 of the vessel. The upper end 36h of the upper draft tube is located in the top section 16h of the vessel and the lower end 38h of that draft tube is located in the middle section 14h of the vessel. The upper end 40h of the lower draft tube is located in the middle section 14h of the vessel, and the lower end 42h of that draft tube is located in the bottom section 12h of the vessel. In this illustration, the lower end of the upper draft tube 30 is directly above the upper end of the lower draft tube 32, and both draft tubes have the same appropriate diameter. A clear vertical space is provided between the draft tubes to allow each draft tube to operate independently.

Figure 9:
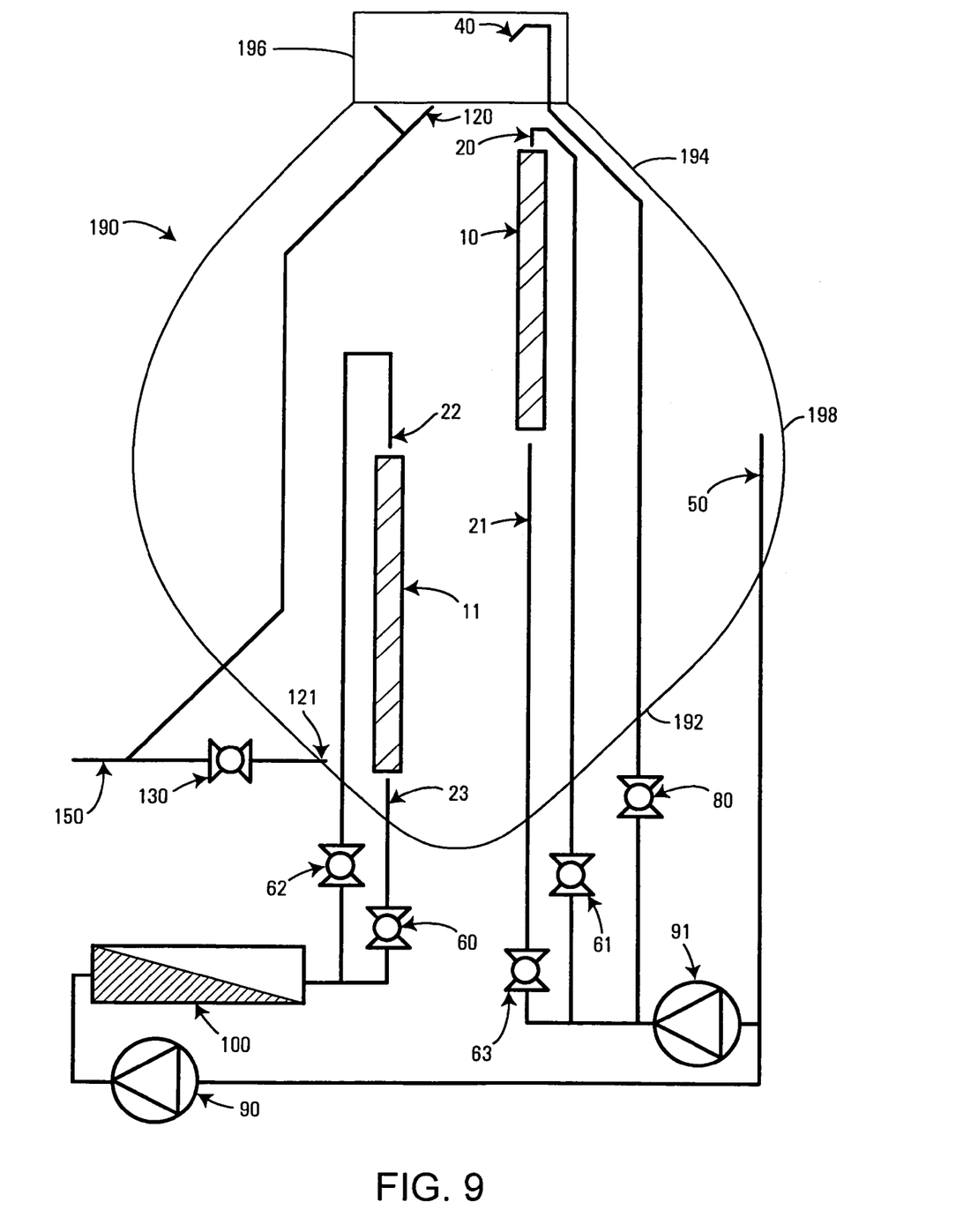
Figure 10:
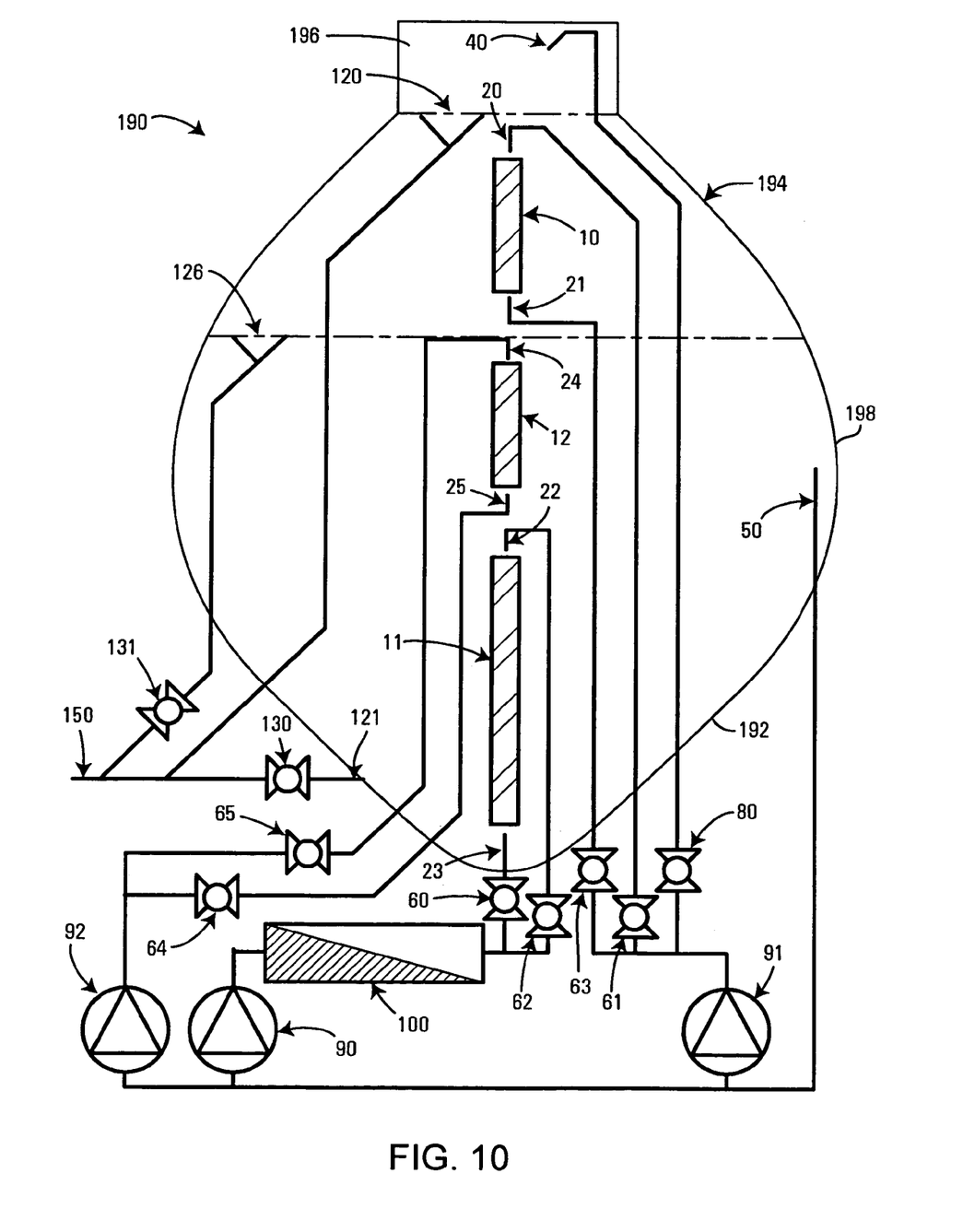
Figure 11:
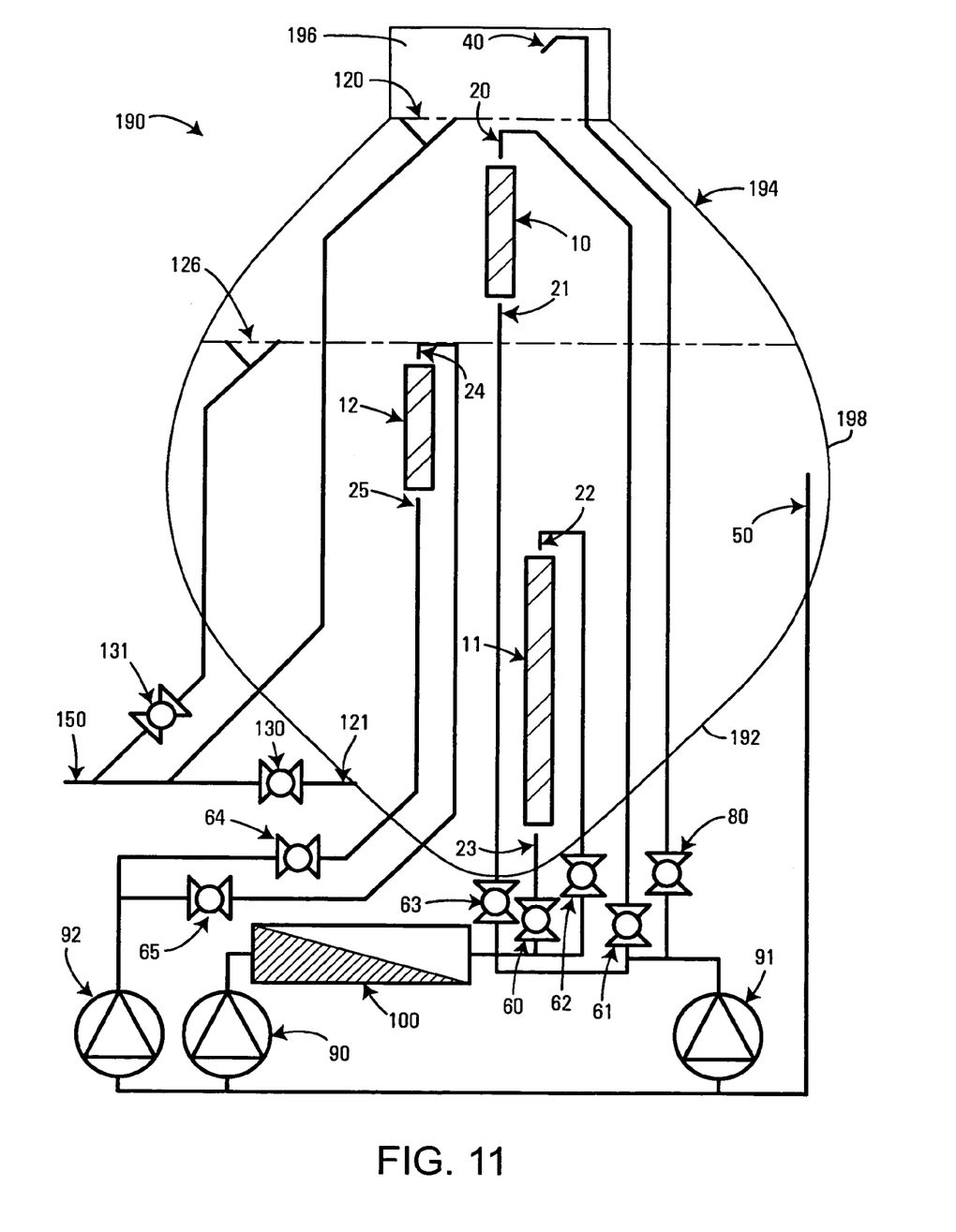

Other arrangements and orientations of the draft tubes could also be used. In FIG. 9, for example, the draft tubes 30, 32 are offset. In FIGS. 10 and 11, the vessels 10j, 10k have a middle draft tube 50 between the upper and lower draft tubes 30, 32.

Each of the illustrated digesters 10 includes structure for pumping liquid through each of the draft tubes. Preferably, this structure includes a separate jet pump for each draft tube. Preferably, each jet pump can be used to selectively pump liquid in either direction through the draft tube. In the embodiment illustrated in FIG. 8, for example, each draft tube 30, 32 includes both an upper jet pump 52, 54 and a lower jet pump 56, 58, and is designed to operate at a flow rate less than that expected to be pumped through a single draft tube. The location of each jet pump with respect to the draft tube induces an additional flow of liquid from the contents of the vessel through the draft tube.

While it is not necessary for any draft tube to have multiple jet pumps, it is preferred that pumps be configured so that they can alternatively be used (1) to simultaneously pump liquid downwards through the upper (or middle) draft tube and upwards through the lower (or middle) draft tube, (2) to simultaneously pump liquid upwards through at least two draft tubes, (3) to simultaneously pump liquid downwards through at least two draft tubes, (4) to simultaneously pump liquid downwards through all the draft tubes, (5) to simultaneously pump liquid upwards through all the draft tubes, and (6) simultaneously pump liquid through at least one draft tube while suppressing foam, scum, foam and froth.

The first option, referred to as "interference mixing," is particularly beneficial. The middle section 14 of the vessel is where most of the digesting mass is located, and using the draft tubes to direct material to that section provides better mixing than is possible using a conventional single draft tube arrangement. When material moving upwards from the bottom section 12 of the digester meets material being pumped downwards from the top section 16 of the digester, the opposing hydraulic forces dissipate their momentum energy through the merging of the two masses, mixing together, and moving away from the interaction section. Simply stated, when two high-volume discharges hit head-on they disperse their relative velocities through momentum transfer. This interference mixing can be extremely effective to optimize the anaerobic digestion process.

FIGS. 10 and 11 illustrate a secondary discharge system in a vessel 10 used in a situation where there are large variations in liquid level depth. In systems that require substantial depth-of-operation changes, the upper draft tube 30 can be left out-of-service until a predetermined liquid depth is reached. Until that time, and while the liquid level is below the top of the upper draft tube 30, the middle draft tube 50 can be used to provide interference mixing by pumping material from near the surface downwards into the main mass, where the material co-mixes with material pumped upwards from the bottom section 12 of the digester through the lower draft tube 32. When the liquid level exceeds the top of the upper draft tube, the upper draft tube can be used to pump liquid downwards to provide interference mixing either between the upper and middle draft tubes (if the middle draft tube is operated to pump upwards) or between the middle and lower draft tubes (if the middle draft tube is operated to pump downwards).

The digesters 10j, 10k illustrated in FIGS. 10 and 11 also include an optional discharge system that consists of two automated discharges. Top section discharge is provided by an internal vertical discharge pipe 60 that has a mouth in the top section 16j, 16k of the digesters, and can provide automatic discharge of digested and floatable solids from the top section of the vessel. The discharge pipe may have a pipe increaser 62 that is placed so the mouth of the discharge pipe is in the plume section when the draft tubes 30 are operating in an upflow mode. In the illustrations, the mouth of the discharge pipe is located slightly above the normal vessel operating level. Bottom section discharge is provided by a bottom section outlet 70 that is provided in the bottom sections of the digesters 10j, 10k, and can provide periodic discharge of materials from the bottom section 12j, 12k. Bottom section discharge through the outlet can be automated, typically through a valve 72.

In the arrangements illustrated in FIGS. 10 and 11, an auxiliary discharge pipe 60a has been provided with a mouth 62a near the top of the middle draft tube 50. The lower elevation of discharge mouth 62a enables it to capture solids at liquid depths below the elevation of discharge mouth 62. When the liquid level in the vessel falls, top section discharge can be still be provided through discharge pipe 60a. A valve 74 is provided on the auxiliary discharge pipe 60a to enable automated discharge through the discharge mouth 62a when the liquid level drops below the elevation of the higher discharge mouth 62.

Figure 12:
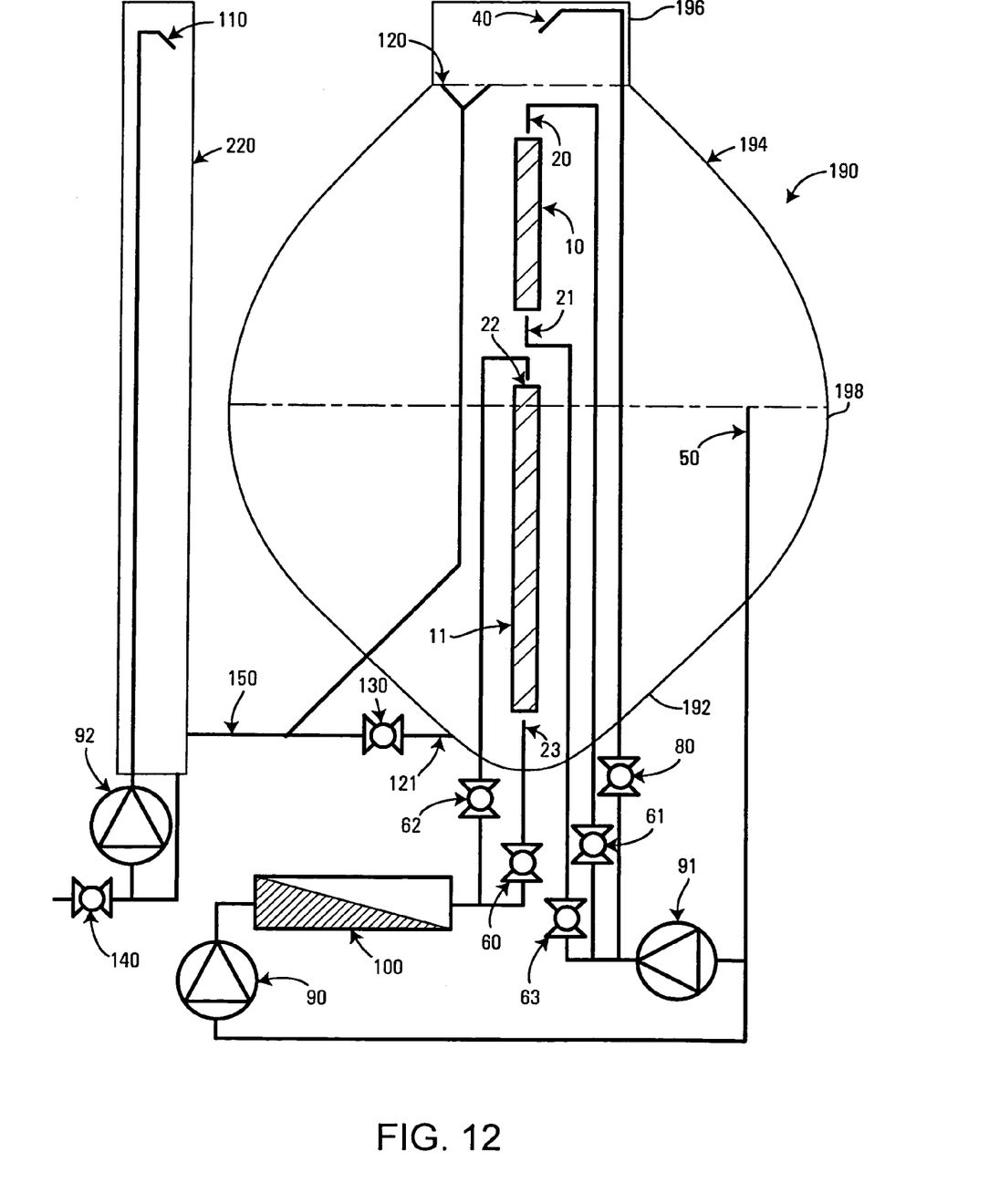

Both top section discharge and bottom section discharge may flow into an isolation or storage tank 80, such as the one seen in FIG. 12. The isolation tank, when utilized, is typically designed to store digested sludge for transport to other downstream systems independent of the anaerobic digester operation.

Each digester 10 depicted in FIGS. 8–12 includes an external liquid recirculation system. The system includes pumps 90, 92, 93 that can be used to remove a portion of the vessel contents. One valve 94 can be used to reintroduce the contents to the vessel for scum and foam suppression by spraying it onto foam or froth on the liquid surface. Other valves 96, 98, 100, 102, can be used to reintroduce the contents through the jet pumps 52, 53, 54, 55, 56, 58. When required, heat may be introduced through an external heat exchanger 110.

This description has been for illustrative purposes only. The scope of the invention is set forth in the following claims.

The invention claimed is:

1. A sludge digester comprising:
   a vessel that has a shell with bottom section with sloped sides, a top section, and a middle section;
   an upper draft tube that has a lower end that opens into the shell and an upper end that opens into the top section;
   a distinct lower draft tube that has an upper end that opens into the shell, beneath the lower end of the upper draft tube, and a lower end that opens into the lower section;
   means for pumping liquid through the upper draft tube; and
   separate, independent means for pumping liquid through the lower draft tube.

2. A sludge digester as recited in claim 1, in which the vessel comprises more than two draft tubes.

3. A sludge digester as recited in claim 1, in which jet pumps are provided as the means for pumping liquid through the draft tubes.

4. A sludge digester as recited in claim 1, in which the middle section is bounded by cylindrical walls.

5. A sludge digester as recited in claim 1, in which the top section slopes inwardly from the middle section.

6. A sludge digester as recited in claim 1, in which the vessel is generally egg-shaped.

7. A sludge digester as recited in claim 1, in which the means for pumping liquid through one of the draft tubes comprises means for pumping liquidly downwardly through that draft tube.

8. A sludge digester as recited in claim 1, in which the means for pumping liquid through the draft tubes comprise means for pumping liquidly downwardly through the upper draft tube and upwardly through the lower draft tube.

9. A sludge digester as recited in claim 1, in which the means for pumping liquid through the draft tubes comprise means for simultaneously pumping liquid downwards through at least one of the draft tubes and upwards through another of the draft tubes.

10. An anaerobic sludge digester comprising:
a vessel for containing a volume of liquid, the vessel having a shell with a bottom section with sloped sides, a top section, and a relatively wide middle section;
an upper draft tube that has upper end in the shell, a lower end in the relatively wide middle section, and an inlet and an outlet at those ends;
a lower draft tube that has an upper end in the relatively wide middle section, beneath the lower end of the upper draft tube, a lower end in the shell, and an inlet and an outlet at those ends; and
means for pumping liquid through one of the draft tubes and separate, independently operable means for pumping liquid through the other of the draft tubes.

11. An anaerobic sludge digester comprising:
a vessel for a volume of liquid, the vessel having a shell with a top section, a relatively wide middle section, and a bottom section with sloped sides;
an upper draft tube with a lower end in the relatively wide middle section;
a lower draft tube with an upper end in the relatively wide middle section, directly below the lower end of the upper draft tube;
means for pumping liquid downwards through the upper draft tube to the relatively wide middle section; and
means for pumping liquid upwardly though the lower draft tube as liquid is being pumped downwardly through the upper draft tube.

12. An anaerobic sludge digester as recited in claim 10, and further comprising an external liquid recirculation system.

13. An anaerobic sludge digester comprising:
a vessel for containing a volume of liquid, the vessel having a shell with a top section, a middle section, and a bottom section with sloped sides;
an upper draft tube with an upper end in the top section;
a lower draft tube with a lower end in the bottom section;
a middle draft tube with an upper end directly beneath the lower end of the upper draft tube; and
means for pumping liquid in one of the drafts tubes in one direction, and for simultaneously pumping liquid in another of the draft tubes in an opposed direction.

* * * * *

UNITED STATES PATENT AND TRADEMARK OFFICE
CERTIFICATE OF CORRECTION

PATENT NO. : 7,172,698 B2 Page 1 of 1
APPLICATION NO. : 10/682050
DATED : February 6, 2007
INVENTOR(S) : Sidney E. Clark et al.

It is certified that error appears in the above-identified patent and that said Letters Patent is hereby corrected as shown below:

In the Claims:

At Column 9, line 12, "liquidly" should be -- liquid --.

At Column 9, line 16, "liquidly" should be -- liquid --.

At Column 9, line 27, "has upper" should be -- has an upper --.

At Column 10, line 29, "drafts" should be -- draft --.

Signed and Sealed this

Twenty-third Day of October, 2007

JON W. DUDAS
*Director of the United States Patent and Trademark Office*